US010747273B1

(12) United States Patent
Wang et al.

(10) Patent No.: US 10,747,273 B1
(45) Date of Patent: Aug. 18, 2020

(54) ELECTRONIC DEVICE HAVING CAMERA MODULE

(71) Applicant: Quanta Computer Inc., Taoyuan (TW)

(72) Inventors: Yen-Ching Wang, Taoyuan (TW);
Chia-Heng Cheng, Taoyuan (TW);
Chia-Fu Lu, Taoyuan (TW)

(73) Assignee: QUANTA COMPUTER INC.,
Guishan Dist., Taoyuan (TW)

( * ) Notice: Subject to any disclaimer, the term of this patent is extended or adjusted under 35 U.S.C. 154(b) by 0 days.

(21) Appl. No.: 16/728,340

(22) Filed: Dec. 27, 2019

(30) Foreign Application Priority Data

Sep. 5, 2019 (TW) .............................. 108211797 U

(51) Int. Cl.
*G06F 1/16* (2006.01)
*H04N 5/225* (2006.01)

(52) U.S. Cl.
CPC .......... *G06F 1/1686* (2013.01); *H04N 5/2254* (2013.01); *H04N 5/2257* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,748,441 A * | 5/1998 | Loritz | .................... | G06F 1/1684 361/679.27 |
| 5,898,600 A * | 4/1999 | Isashi | .................... | G06F 1/1618 345/169 |
| 6,587,151 B1 * | 7/2003 | Cipolla | .................. | G06F 1/1607 348/207.1 |
| 6,812,958 B1 * | 11/2004 | Silvester | ............... | G06F 1/1607 348/207.1 |
| 6,859,358 B2 * | 2/2005 | Baldwin | ............... | G06F 1/1616 348/552 |
| 6,873,356 B1 * | 3/2005 | Kanbe | ..................... | G03B 29/00 348/207.1 |
| 7,884,970 B2 * | 2/2011 | Hiroyasu | ................. | G06F 1/162 345/1.2 |
| 7,969,505 B2 * | 6/2011 | Saito | ...................... | G06F 1/1616 348/370 |
| 7,973,856 B2 * | 7/2011 | Lee | ......................... | G06F 1/1616 348/375 |
| 8,081,437 B2 * | 12/2011 | Leng | ....................... | G03B 29/00 361/679.21 |
| 8,489,157 B2 * | 7/2013 | Rak | ........................ | G06F 1/1616 379/428.01 |
| 9,197,794 B2 * | 11/2015 | Ohtaka | ................. | H04N 5/2252 |
| 9,367,140 B2 * | 6/2016 | Leung | ..................... | G06F 3/017 |
| 9,389,780 B2 * | 7/2016 | Lin | ...................... | G06F 3/04883 |

(Continued)

*Primary Examiner* — Lisa Lea-Edmonds
(74) *Attorney, Agent, or Firm* — McClure, Qualey & Rodack, LLP

(57) ABSTRACT

An electronic device is provided, including a display module, a base and a camera module. The base has an upper shell member, and the display module is pivotally connected to the base and is rotatable relative to the base. The camera module is disposed on the upper shell of the base and can be switched between a closed mode and an open mode. The camera module has a lens. When the camera module is switched from the closed mode to the open mode, the camera module protrudes from the upper surface of the upper case member, and the optical axis of the lens is inclined toward the upper surface.

10 Claims, 9 Drawing Sheets

(56) References Cited

U.S. PATENT DOCUMENTS

| | | | | |
|---|---|---|---|---|
| 9,407,805 B2* | 8/2016 | Ohtaka | ............ | H04N 5/23203 |
| 9,483,080 B2* | 11/2016 | Kwong | ................ | G06F 1/1639 |
| 10,013,031 B2* | 7/2018 | Knepper | ................ | E05D 11/00 |
| 10,101,777 B1* | 10/2018 | Tucker | ................ | G06F 1/1686 |
| 10,218,942 B2* | 2/2019 | Tucker | ................ | H04N 7/183 |
| 2002/0080231 A1* | 6/2002 | Feierbach | ............ | G06F 1/1686 |
| | | | | 348/14.02 |
| 2007/0182663 A1* | 8/2007 | Biech | ................ | G06F 1/1654 |
| | | | | 345/1.1 |
| 2012/0224314 A1* | 9/2012 | Hinshaw | ................ | G06F 3/023 |
| | | | | 361/679.09 |
| 2017/0123463 A1* | 5/2017 | Douglas | ................ | G06F 3/021 |
| 2019/0317561 A1* | 10/2019 | Cheng | ................ | G06F 1/203 |

* cited by examiner

US 10,747,273 B1

ELECTRONIC DEVICE HAVING CAMERA MODULE

CROSS REFERENCE TO RELATED APPLICATIONS

This application claims the benefit of Taiwan Patent Application No. 108211797, filed on Sep. 5, 2019, the entirety of which is incorporated by reference herein.

BACKGROUND OF THE INVENTION

Field of the Invention

The application relates in general to an electronic device, and in particular to an electronic device that includes a camera module.

Description of the Related Art

Thanks to ongoing technological developments, people's pursuit of high-performance and high-standard visual enjoyment of electronic products is getting higher and higher, so as to enrich the experience of product use. For example, the screen border of a laptop computer is narrower than in the past, so that the display surface can be made larger on the same size screen to enhance viewing. Currently, laptop computers on the market are often equipped with a lens device for performing facial recognition and video phone functions, and the lens is often mounted on the border of the screen. However, the lens device has a predetermined thickness, which may affect the display area of the display surface. In view of this, how to provide a computer device that is aesthetically pleasing, has a larger display surface and is equipped with an excellent camera lens has become an important issue.

BRIEF SUMMARY OF INVENTION

To address the deficiencies of conventional products, an embodiment of the invention provides an electronic device, comprising a display module, a base and a camera module. The base has an upper shell member, and the display module is pivotally connected to the base and is rotatable relative to the base. The camera module is disposed on the upper shell of the base and can be switched between a closed mode and an open mode. The camera module has a lens. When the camera module is switched from the closed mode to the open mode, the camera module protrudes from the upper surface of the upper case member, and the optical axis of the lens is inclined toward the upper surface.

In some embodiments, the base has a keyboard module disposed on the upper surface, and the upper surface has an outermost edge, and the camera module is disposed between the outermost edge and the keyboard module.

In some embodiments, a pivotal area is disposed between the base and the display module, and the camera module is located between the keyboard module and the pivotal area.

In some embodiments, the base includes a supporting mechanism disposed in the upper shell member of the base for sustaining the camera module.

In some embodiments, the supporting mechanism includes a fixed plate, a holder, a limiting member, and an elastic member. The holder is disposed on the fixed plate and is configured to support the camera module. The limiting member is movably disposed on the fixed plate and is configured to limit the holder. The elastic member connects the fixed plate to the holder. The holder is engaged with the limiting member when the camera module is in the closed mode. The holder is engaged with the upper shell member of the base when the camera module is in the open mode.

In some embodiments, the holder has an engaging portion, and when the camera module is switched from the closed mode to the open mode, the engaging portion pushes the limiting member and leaves away from the bottom of the limiting member, and the engaging portion abuts an inner surface of the upper shell member of the base.

In some embodiments, the elastic member is a torsion spring, and when the engaging portion is away from the bottom of the limiting member, the torsion spring applies an elastic force to drive the camera module to protrude from the upper shell member of the base.

In some embodiments, the engaging portion has a first guiding surface, and the limiting member has a first contact surface, and when the camera module is switched from the closed mode to the open mode, the first guiding surface abuts and squeezes the first contact surface, and the engaging portion pushes the limiting member to move away from the engaging portion.

In some embodiments, the engaging portion has a second guiding surface, and the limiting member has a second contact surface, and when the camera module is switched from the open mode to the closed mode, the second guiding surface abuts and squeezes the second contact surface, and the engaging portion pushes the limiting member to move away from the engaging portion, wherein in a direction that is perpendicular to the upper surface of the upper shell member, the position of the second guiding surface is different from the position of the first guiding surface, and the position of the second contact surface is different from the position of the first contact surface.

In some embodiments, the upper surface of the upper shell member has an opening, and an edge of the opening forms a slanted edge surface with respect to the upper surface.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the optical systems are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood to one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Further, spatially relative terms, such as "below", "lower", "above", "upper", and the like, may be used herein for ease of description to describe one element or feature's relationship to other elements or features as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. Terms such as "connected", "attached", "affixed", and "interconnected", refer to a relationship wherein structures are secured or attached to one another either directly or indirectly through intervening structures, as well as both movable or rigid attachments or relationships, unless expressly described otherwise.

Figure 1A:
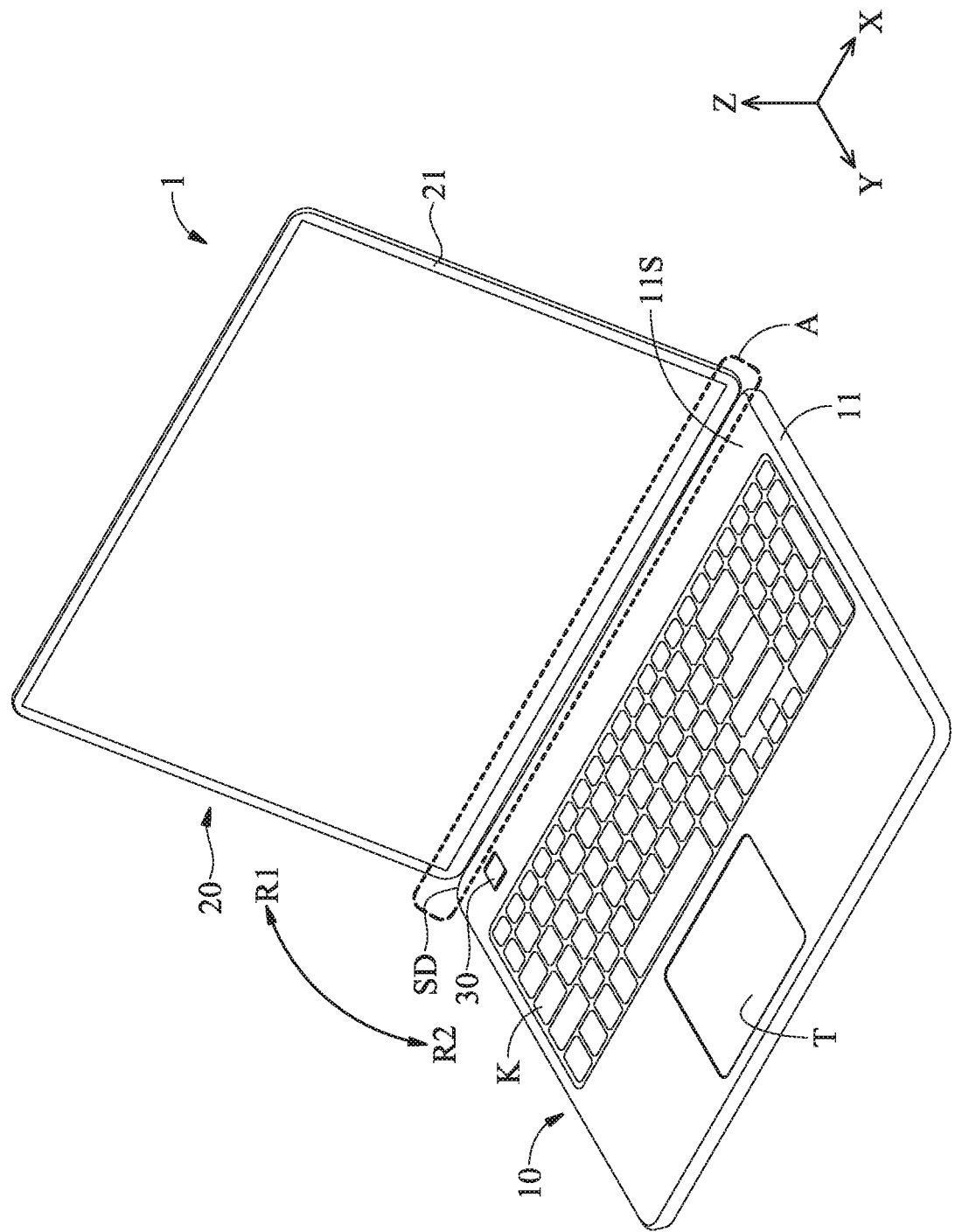
FIG. 1A is a schematic diagram of an electronic device and a camera module thereof in a closed mode according to an embodiment of the present invention.

FIG. 1A is a schematic diagram showing an electronic device 1 according to an embodiment of the present invention. As shown in FIG. 1A, the electronic device 1, for example, can be a laptop computer, including a base 10 and a display module 20. The base 10 can be used to an input module including a keyboard module K and a touch pad T, and the display module 20 can be a display screen for displaying an image for viewing to a user. The display module 20 is connected to the base 10 in a movable and rotatable manner to allow the electronic device 1 to switch between a folded state and an open state. For example, the display module 20 can be pivoted to the base 10 by a pivotal connection (such as a hinge module), so that the display module 20 is rotatable relative to the base 10, such as the rotating direction R1 and R2 showing in FIG. 1A.

Figure 1B:
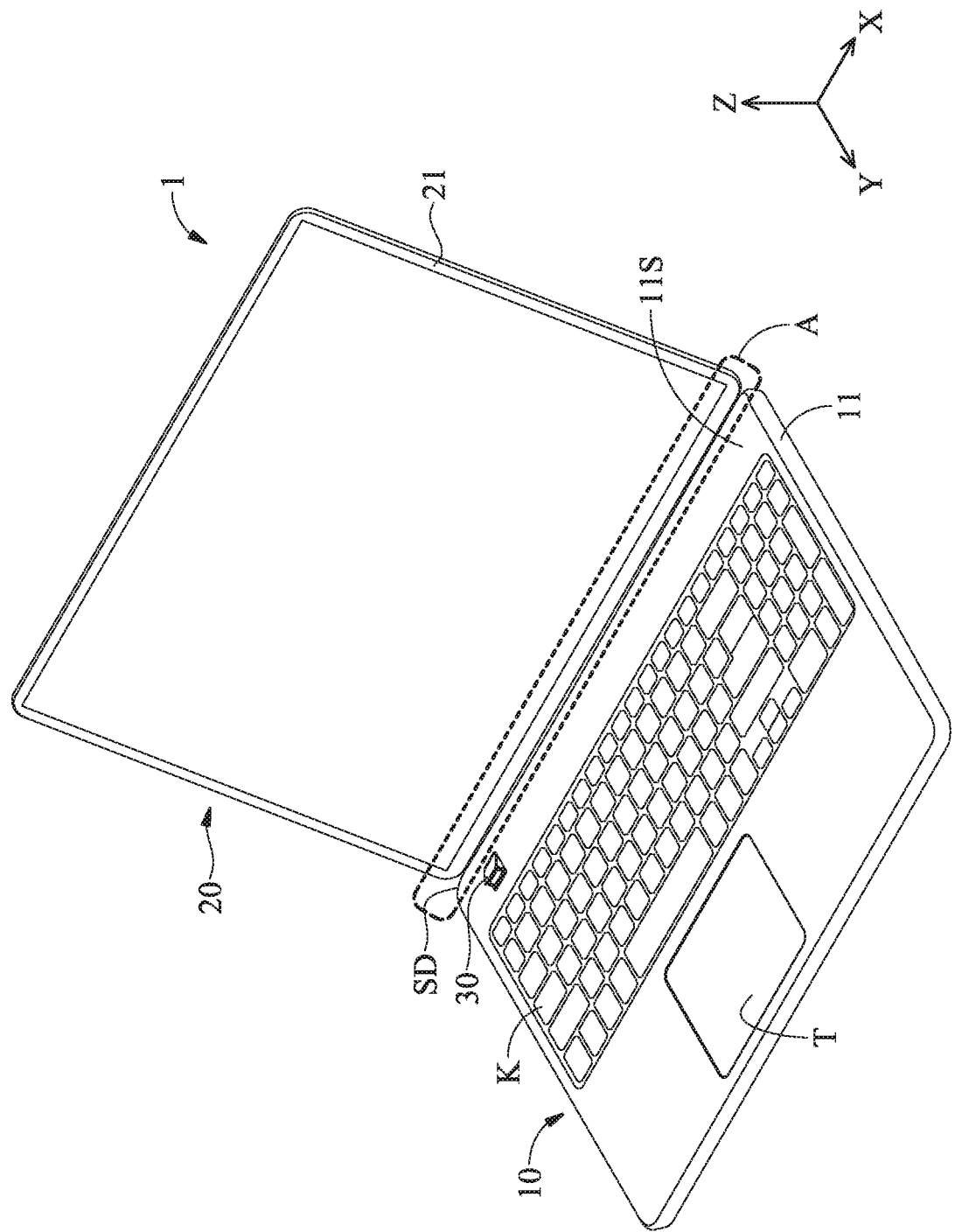
FIG. 1B is a schematic diagram of the camera module in FIG. 1A in an open mode.

The electronic device 1 further comprises a camera module 30 disposed in the base 10, which may include photographing, recording, video, and/or recognition functions. The camera module 30 can be switched between a closed mode (FIG. 1A) and an open mode (FIG. 1B). In some embodiments, with the control program settings of the electronic device, the camera module 30 can be activated to perform the foregoing functions when it is in the open mode (the user can also manually operate the control program to turn it off); and turn off these functions in the closed mode. When in the open mode, a lens 31 of the camera module 30 is exposed above an upper shell member 11 of the base 10. In this embodiment, the lens 31 and the upper surface 11S of the upper shell member 11 have an inclination angle of 15 to 30 degrees. When in the closed mode, the lens 31 is embedded and accommodated in the base 10, that is, not exposed to the upper shell member 11. The lens 31 may be aligned with or lower than the upper surface 11S (in Z-axis direction) of the upper shell member 11.

The position of the camera module 30 is located on the upper shell member 11 of the base 10. In this embodiment, the keyboard module K of the base 10 is located on the upper surface 11S of the upper shell member 11, and the upper surface 11S has an outermost edge SD, and the camera module 30 is disposed between the outermost edge SD and the keyboard module K. When viewed from a direction that is perpendicular to the upper surface 11S of the upper shell member 11, the camera module 30 is located between the keyboard module K and a pivotal region A, wherein the pivotal region A is situated between the base 10 (or the keyboard module K thereof) and the display module 20.

The camera module 30 of the present embodiment is located at a portion of the upper shell member 11 of the base 10 which is near the display module 20, or the camera module 30 is located between the keyboard module K of the base 10 and the display module 20. In other embodiments, the camera module 30 can be disposed on a portion of the upper shell member 11 of the base 10 which is away from the display module 20, such as near the touch pad T or near a side of the keyboard module K away from the display module 20. In this way, by arranging the camera module 30 on the base 10, a frame 21 of the display module 20 (with no lens) can be narrower than the frame of the conventional lens display screen, thereby increasing the display area.

The arrangement of the camera module 30 and the base 10 and the camera module 30 switching between the closed and open modes is described in detail below.

Figure 2A:
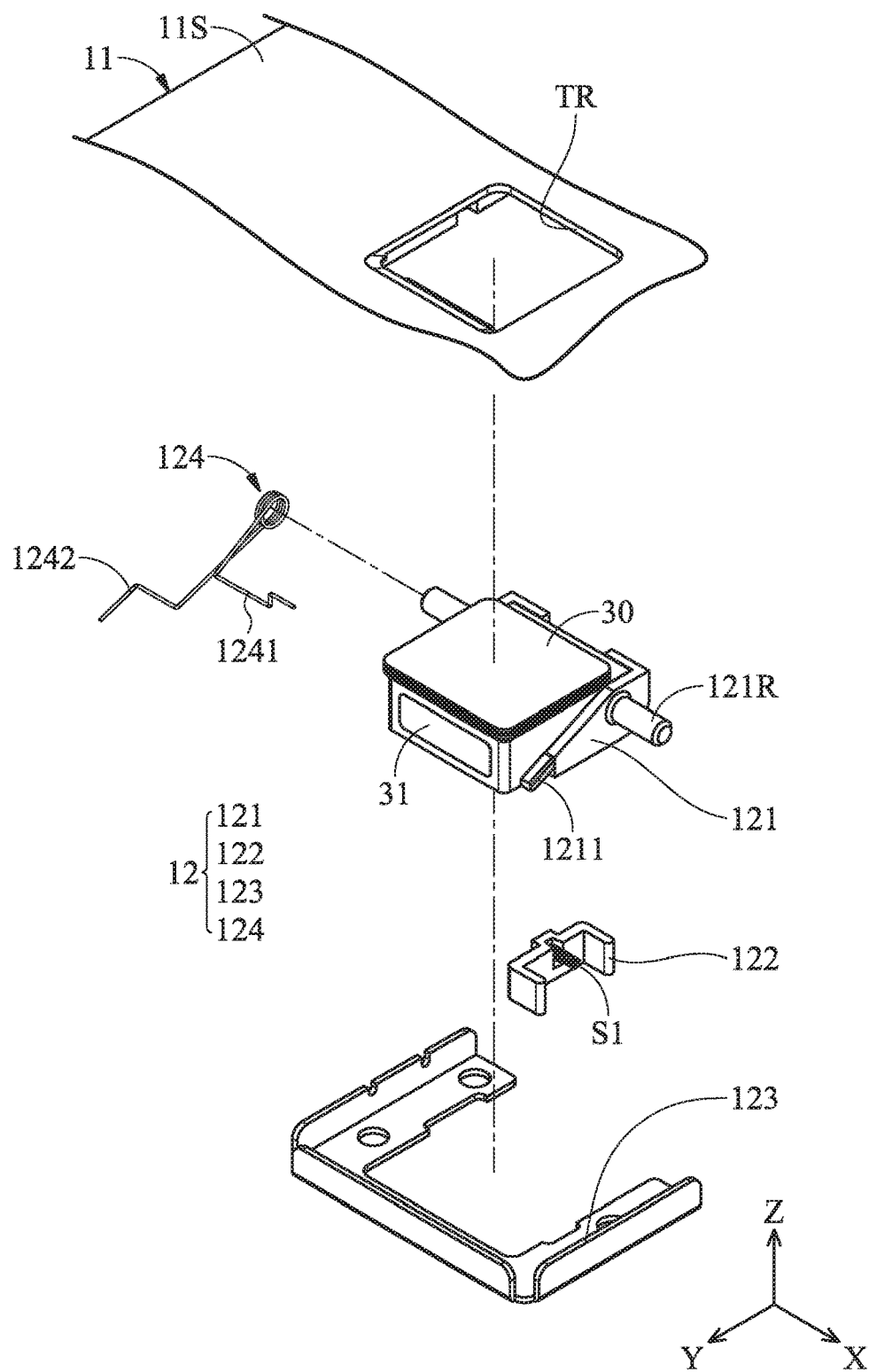
FIG. 2A is an exploded view diagram of the camera module and a portion of the upper shell member and a supporting mechanism of the base.
Figure 2B:
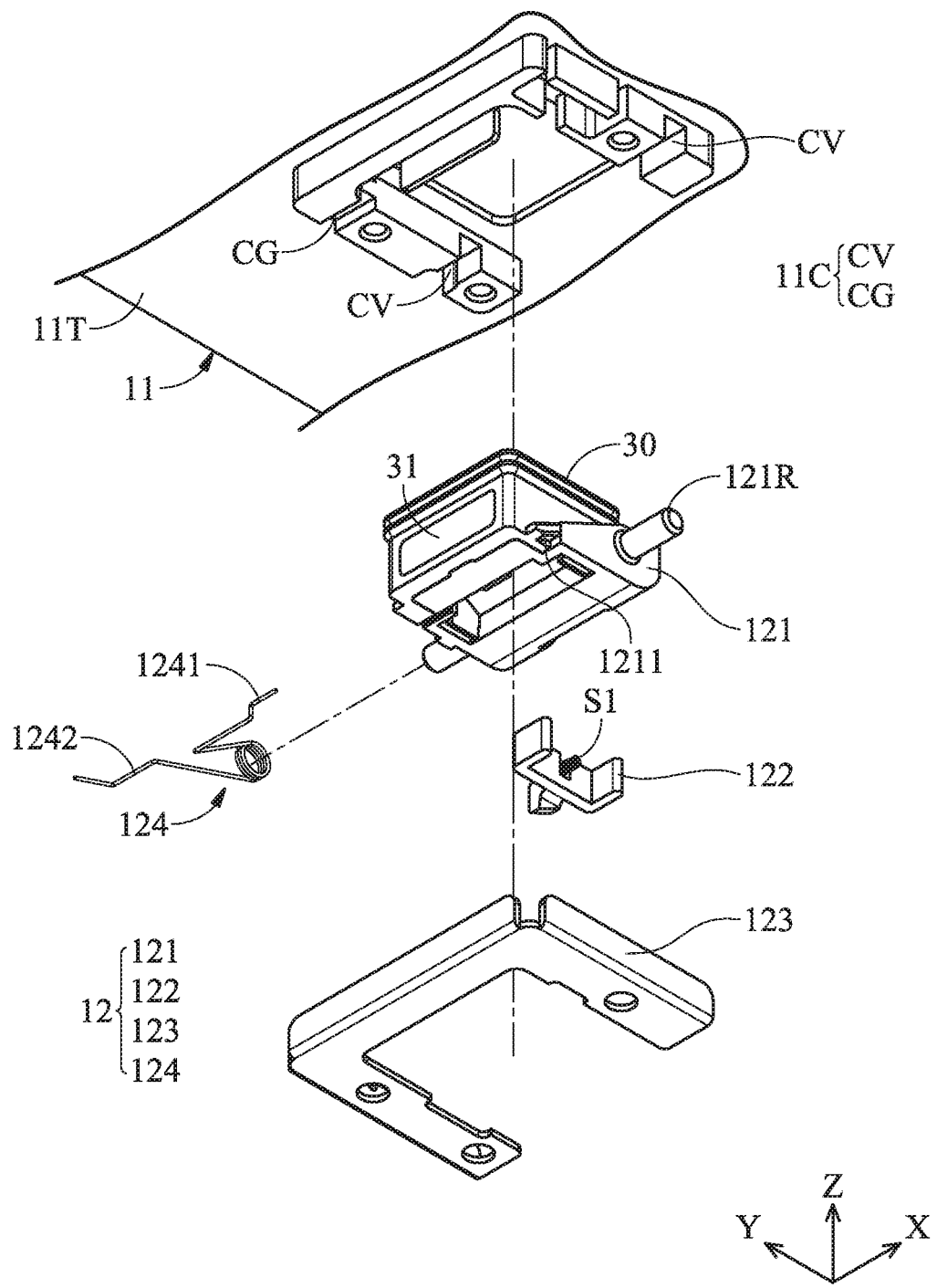
FIG. 2B is another exploded view diagram of the camera module and the portion of the upper shell member and the supporting mechanism of the base.

Please refer to FIGS. 2A and 2B, which show exploded views of a part of the upper shell member 11 of the base 10 and the camera module 30. The camera module 30 is disposed inside the base 10. The base 10 further includes a supporting mechanism 12 for sustaining or carrying the camera module 30. The upper shell member 11 of the base 10 has an opening TR for exposing the camera module 30. The supporting mechanism 12 includes a holder 121, a limiting member 122, a fixed plate 123 and an elastic member 124.

The holder 121 is configured to carry the camera module 30, and the holder 121 is disposed on the fixed plate 123. The fixed plate 123 is fixed to a fixed structure 11C (FIG. 2B) on the inner surface 11T of the upper shell member 11, wherein the two (the fixed plate 123 and the fixed structure 11C) are fixed to each other, for example, by screwing or applying adhesive, so that the holder 121 and the camera module 30 correspond to the opening TR of the upper shell member 11. The limiting member 122 includes an elastic element S1 which is movably disposed on the fixed plate 123 and is used for limiting the holder 121. The elastic element S1 can be a spring. In some embodiments, the limiting member 122 may have a flexible material and may not have an elastic element S1. The elastic member 124 is disposed on the holder 121, in detail, it is disposed around a shaft portion 121R of the holder 121, and a first segment portion 1241 of the elastic member 124 located below the holder 121 can drive the holder 121 and the camera module 30 to move, so that the camera module 30 is switchable between the aforementioned closed mode and the open mode. About switching mode, will be described in detail later.

The fixed structure 11C located on the inner surface 11T of the upper shell member 11 includes a groove CV and a recess CG, wherein the groove CV is for receiving the shaft portion 121R of the holder 121 and the elastic member 124, and the slot CG is for receiving a second segment portion 1242 of the elastic member 124. The second segment portion 1242 has an L-shaped structure, and the elastic member 124 is fixedly connected to the fixed plate 123 via the second segment portion 1242.

Figure 3A:
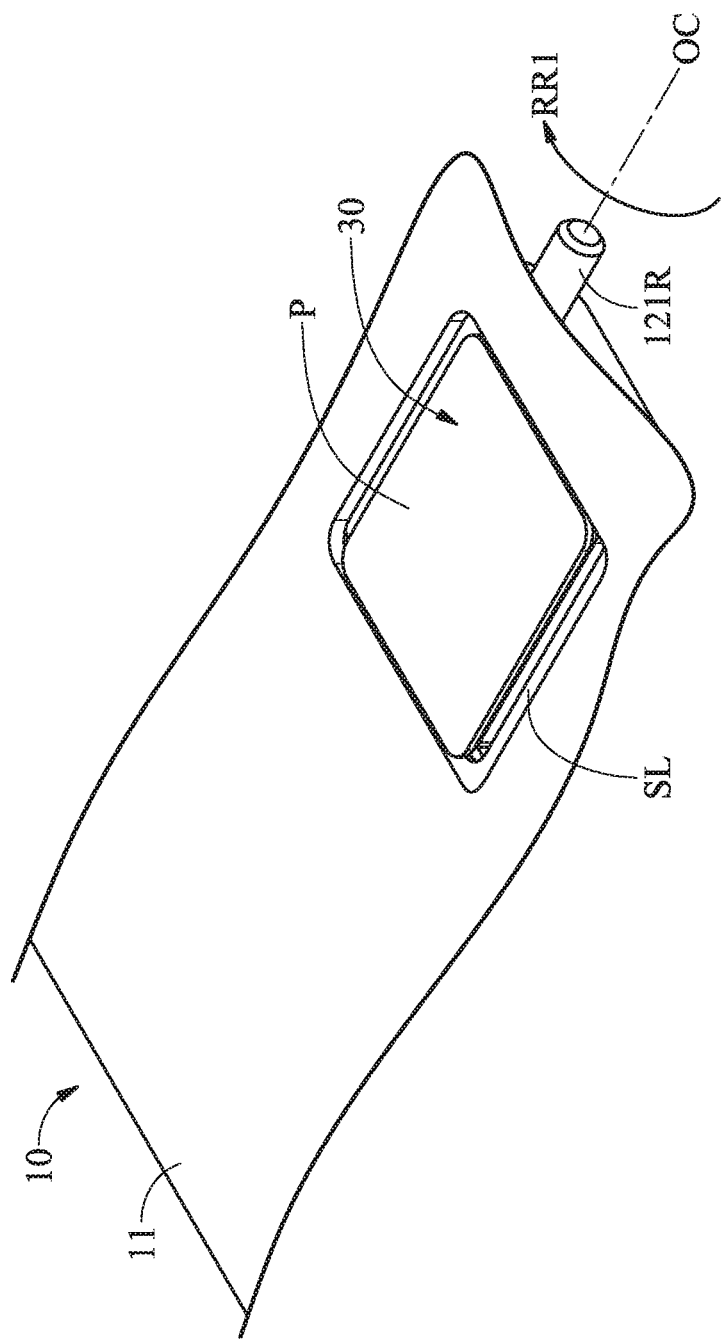
FIG. 3A is a schematic diagram of the camera module in the closed mode.
Figure 3B:
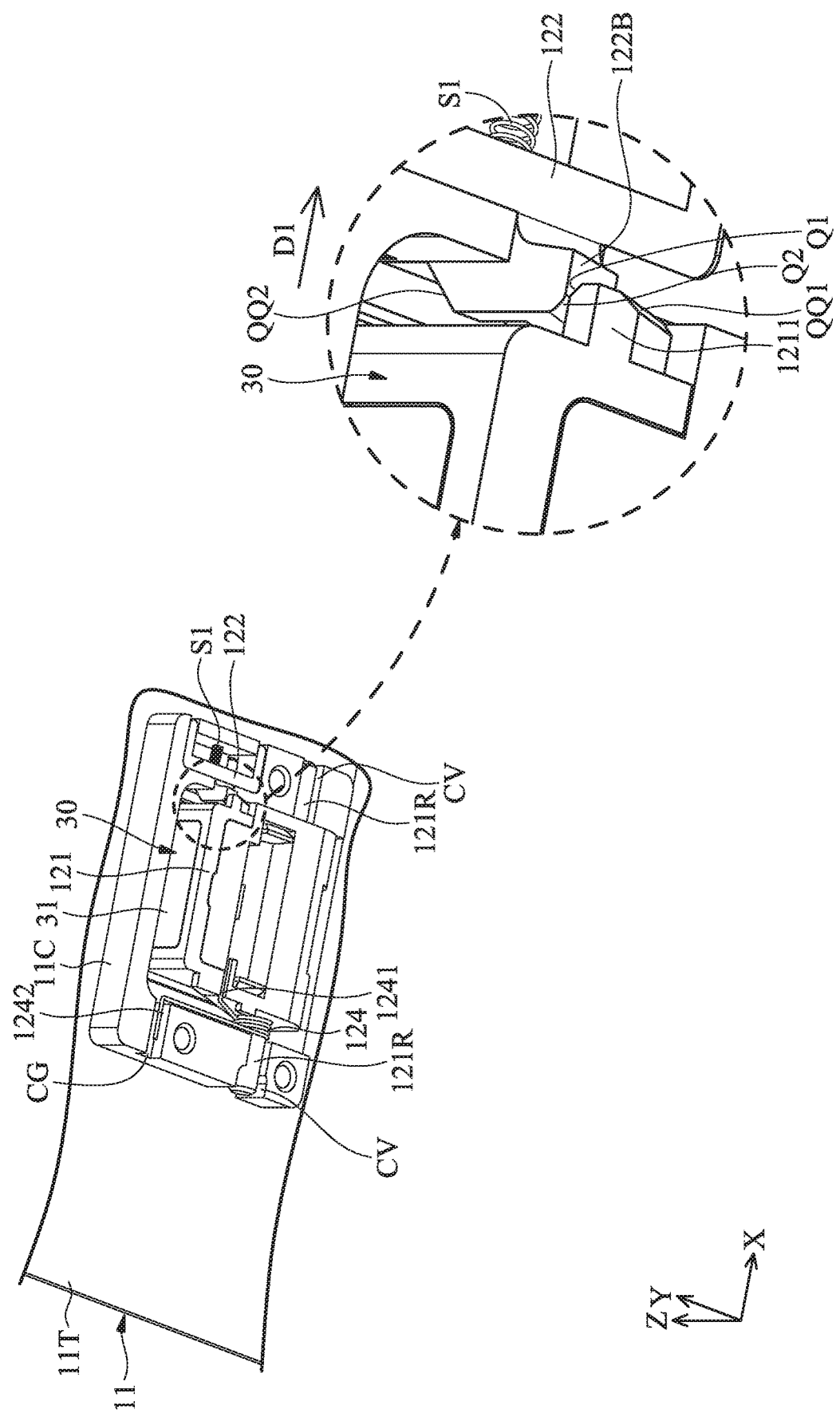
FIG. 3B is another schematic diagram of the camera module in the closed mode.
Figure 4A:
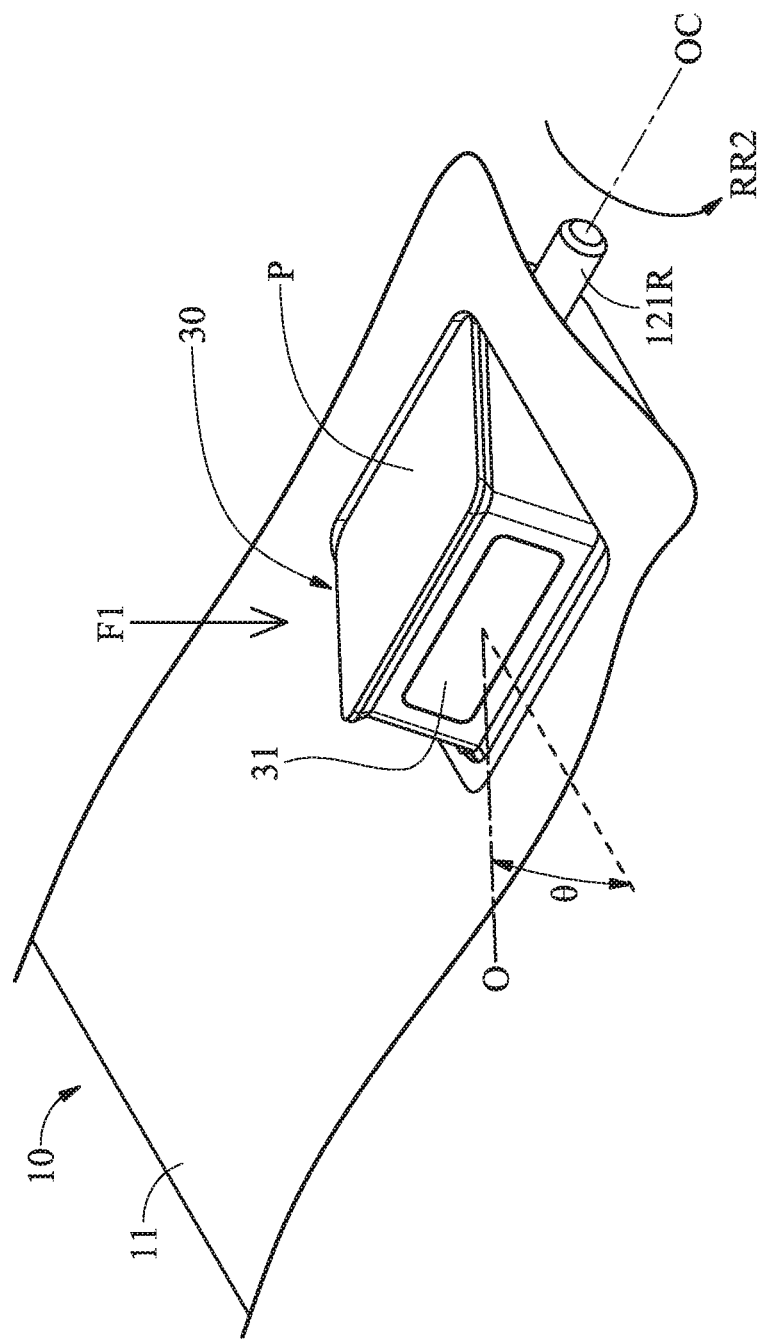
FIG. 4A is a schematic diagram of the camera module in the open mode.

As shown in FIGS. 3A and 3B, when the camera module 30 is in the closed mode, an engaging portion 1211 of the holder 121 is engaged with the bottom portion 122B of the limiting member 122 and located below (Z-axis direction) the bottom portion 122B. The engaging portion 1211 has a first guiding surface Q1, and the bottom portion 122B of the limiting member 122 has a first contact surface Q2. The first guiding surface Q1 and the first contact surface Q2 are abutting each other. Both the first guiding surface Q1 and the first contact surface Q2 have a sloped surface or a circular arc structure. When the user wants to open the camera module 30 to use its function, the camera module 30 can be rotated around a central axis OC of the shaft portion 121R by moving an upper cover portion P of the camera module 30 (as the rotation direction RR1 in FIG. 3A), to switch to the open mode, as shown in FIG. 4A. In the open mode, an oblique angle θ is formed between an optical axis O of the lens 31 and the upper surface 11S. In the embodiment, the angle θ is 15 to 30 degrees to facilitate capturing the picture of the user.

Figure 3C:
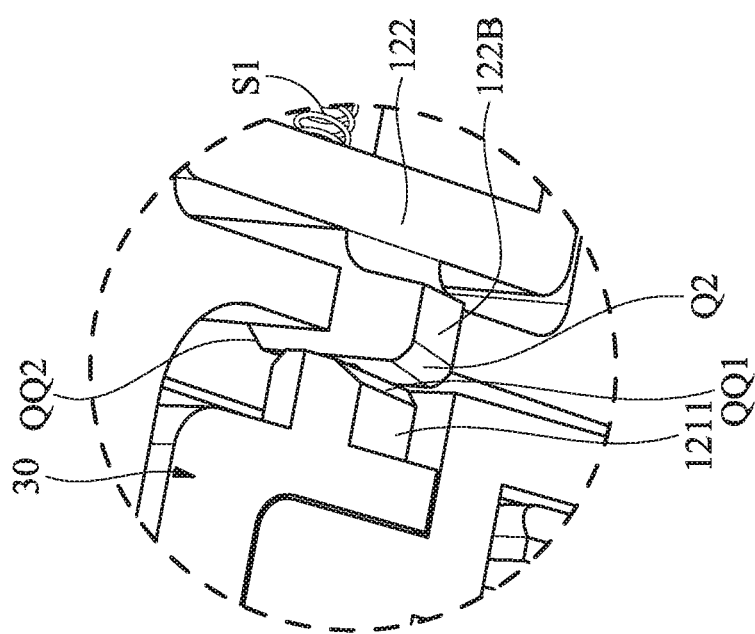
FIG. 3C is a schematic diagram of the camera module switching between the closed mode and the open mode.
Figure 4B:
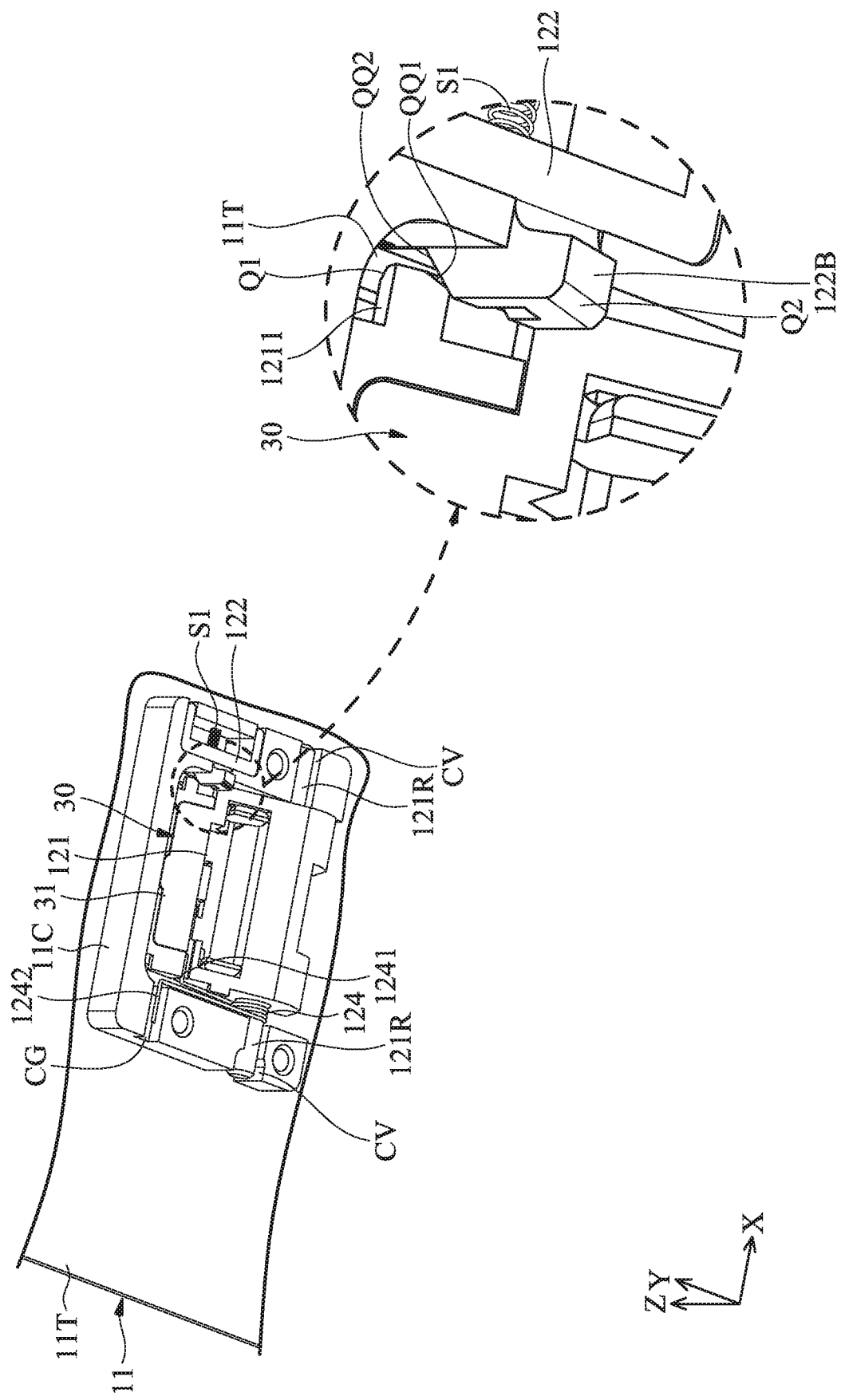
FIG. 4B is another schematic diagram of the camera module in the open mode.

Regarding the process of switching the camera module 30 from the closed mode to the open mode, please refer to FIGS. 3B, 3C, and 4B in sequence. The camera module 30 is applied with a force that is turned up, so that the engaging portion 1211 of the holder 121 carrying the camera module 30 presses against the limiting member 122, and through the contact surface Q1 of the engaging portion 1211 and the contact surface Q2 of the limiting member 122, the holder 122 moves the limiting member 122 toward a first direction D1 (FIG. 3B) to retreat a space, as shown in FIG. 3C, the engaging portion 1211 is disengaged from the bottom portion 122B of the limiting member 122, and the first guiding surface Q1 no longer abuts against the first contact surface Q2. Then, as shown in FIG. 4B, the engaging portion 1211 abuts against the inner surface 11T of the upper shell member 11 to limit the positioning of the holder 121 and the camera module 30, so that the camera module 30 can be switched to the open mode as presented in FIG. 4A. In addition, the limiting member 122 no longer bears the pressing force from the engaging portion 1211 in the first direction D1, and returns to the initial position by the elastic force from the elastic element S1.

It should be noted that when the engaging portion 1211 of the holder 121 has left away the bottom portion 122B of the limiting member 122, since it is no longer restricted by the limiting member 122, the elastic member 124 on the other side of the holder 121 can provide an elastic force to drive the holder 121 and the camera module 30, so that the camera module 30 protrudes from the upper shell member 11, and can drive the carrier member 121 and the camera module 30 to the positioning position in the open mode. In this way, the user only needs to gently apply a force to disengage the engaging portion 1211 of the holder 121 from the bottom of the limiting member 122 (as shown in FIG. 3C), and can easily take the camera module 30 switched to the open mode by the elastic force of the elastic member 124 without continuously applying a force to rotate the camera module 30 in the rotation direction RR1, thereby greatly improving the convenience of use. In the embodiment, the elastic member 124 is a torsion spring. In other embodiments, the elastic member 124 can be replaced by a compression spring and connected to the inner surface 11T of the upper shell member 11 and the holder 121.

Conversely, when the camera module 30 is to be switched from the open mode to the closed mode, the user can apply a force F1 to the camera module 30 in the Z-axis direction (see FIG. 4A), so that the holder 121 rotates around the central axis OC in the rotation direction RR2, a second guiding surface QQ1 of the engaging portion 1211 of the holder 121 presses (or pushes) against (or squeezes) a second contact surface QQ2 of the limiting member 122, so that the holder 121 pushes the limiting member 122 again (as FIG. 3C) to move in the first direction D1. Then, the engaging portion 1211 is lowered below the bottom portion 122B of the limiting member 122, the limiting member 122 is reset by the elastic element S1, and the bottom portion 122B is engaged with the engaging portion 1211 of the holder 121 (as FIG. 3B), so that the camera module 30 reverts to the closed mode. In the present embodiment, in a direction that is perpendicular to the upper surface 11S of the upper shell member 11 (Z-axis), the positions of the second guiding surface QQ1 and the first guiding surface Q1 are different, and the second contact surface QQ2 and the first contact surface Q2 has a different position.

As described above, the camera module 30 is disposed on the upper shell member 11 of the base 10 and is switchable between an open mode and a closed mode. Compared with the conventional electronic device in which the camera module is disposed on the display module, the present invention provides the camera module 30 on the base 10, so that the frame 21 of the display module 20 can be narrower, and the display area of the display module 20 is increased to enhance the viewing experience. In addition, the camera module 30 can be switched between the open mode and the closed mode, wherein the lens is above the base 10 when need to use it; also, it can be accommodated in the base 10 when not in use. Therefore, the user can immediately switch the use state of the camera module 30, and can also intuitively see whether the camera module 30 is enabled, to avoid the camera module 30 being turned on or be damaged by unnecessary collision when not in use. Furthermore, as shown in FIG. 3A, a slanted or an inclined edge (or edge surface) SL with respect to the upper surface 11S of the upper shell member 11 is formed at the edge of the opening TR, so that the user can easily apply a force to the upper cover portion P to open the camera module 30.

In summary, the present invention provides an electronic device, comprising a display module, a base and a camera module. The base has an upper shell member, and the display module is pivotally connected to the base and is rotatable relative to the base. The camera module is disposed on the upper shell of the base and can be switched between a closed mode and an open mode. The camera module has a lens. When the camera module is switched from the closed mode to the open mode, the camera module protrudes from the upper surface of the upper case member, and the optical axis of the lens is inclined toward the upper surface.

The present embodiment has at least one of the following advantages or functions. The camera module is disposed on the base, and the frame of the display module is narrower than that of the electronic device in which the camera module is disposed on the screen, which increases the display area of the display module to provide a better viewing experience. In addition, the camera module can be switched between the open mode and the closed mode, wherein the lens thereof is placed above the base when it is used, and it can be placed in the base when it is not needed to use, so that the user can switch immediately and easily, and the state of use of the camera module can also be visually seen whether the camera module is enabled, to avoid the camera module being turned on when not in use.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with the true scope of the disclosed embodiments being indicated by the following claims and their equivalents.

What is claimed is:

1. An electronic device, comprising:
    a display module;
    a base, having an upper shell member, wherein the display module is pivotally connected to the base and is rotatable relative to the base;
    a camera module, disposed on the upper shell member of the base and which can be switched between a closed mode and an open mode, wherein the camera module has a lens;
    wherein when the camera module is switched from the closed mode to the open mode, the camera module protrudes from an upper surface of the upper shell member, and an optical axis of the lens is inclined toward the upper surface.

2. The electronic device as claimed in claim 1, wherein the base has a keyboard module disposed on the upper surface, and the upper surface has an outermost edge, and the camera module is disposed between the outermost edge and the keyboard module.

3. The electronic device as claimed in claim 2, wherein a pivotal area is disposed between the base and the display module, and the camera module is located between the keyboard module and the pivotal area.

4. The electronic device as claimed in claim 1, wherein the base includes a supporting mechanism disposed in the upper shell member of the base for supporting the camera module.

5. The electronic device as claimed in claim 4, wherein the supporting mechanism includes:
    a fixed plate;
    a holder, disposed on the fixed plate and configured to support the camera module;
    a limiting member, movably disposed on the fixed plate and configured to limit the holder; and
    an elastic member, connecting the fixed plate to the holder;
    wherein the holder is engaged with the limiting member when the camera module is in the closed mode, and the holder is engaged with the upper shell member of the base when the camera module is in the open mode.

6. The electronic device as claimed in claim 5, wherein the holder has an engaging portion;
    wherein when the camera module is switched from the closed mode to the open mode, the engaging portion pushes the limiting member and leaves away from a bottom of the limiting member, and the engaging portion abuts an inner surface of the upper shell member of the base.

7. The electronic device as claimed in claim 6, wherein the elastic member is a torsion spring, and when the engaging portion is away from the bottom of the limiting member, the torsion spring applies an elastic force to drive the camera module to protrude from the upper shell member of the base.

8. The electronic device as claimed in claim 6, wherein the engaging portion has a first guiding surface, and the limiting member has a first contact surface, and when the camera module is switched from the closed mode to the open mode, the first guiding surface abuts and pushes against the first contact surface, and the engaging portion pushes the limiting member to move away from the engaging portion.

9. The electronic device as claimed in claim 8, wherein the engaging portion has a second guiding surface, and the limiting member has a second contact surface, and when the camera module is switched from the open mode to the closed mode, the second guiding surface abuts and pushes against the second contact surface, and the engaging portion pushes the limiting member to move away from the engaging portion, wherein in a direction that is perpendicular to the upper surface of the upper shell member, the position of the second guiding surface is different from the position of the first guiding surface, and the position of the second contact surface is different from the position of the first contact surface.

10. The electronic device as claimed in claim 1, wherein the upper surface of the upper shell member has an opening, and an edge of the opening forms a slanted edge surface with respect to the upper surface.

* * * * *